Feb. 28, 1967  G. SCHWARZKOPF  3,307,125
OSCILLATING ARMATURE FOR ELECTRICALLY DRIVEN CHRONOMETERS
Filed Oct. 18, 1965
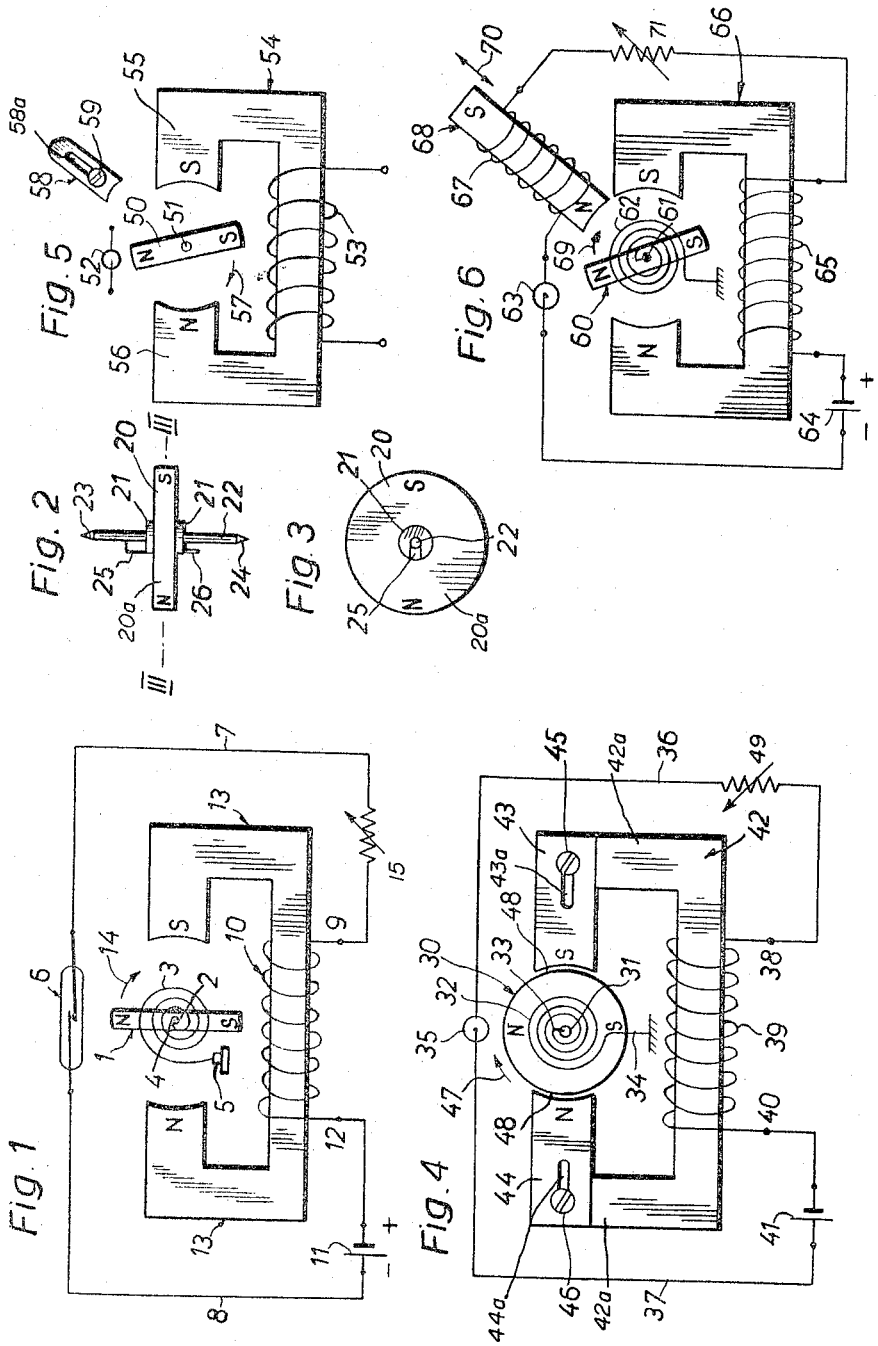
Gabriel Schwarzkopf,
Inventor
By Wenderoth, Lind & Ponack
Attorneys United States Patent Office 3,307,125
Patented Feb. 28, 1967

3,307,125
OSCILLATING ARMATURE FOR ELECTRICALLY DRIVEN CHRONOMETERS
Gabriel Schwarzkopf, 1 Plattenweg,
Biel, Bern, Switzerland
Filed Oct. 18, 1965, Ser. No. 496,938
Claims priority, application Switzerland, Oct. 23, 1964, 13,762/64
20 Claims. (Cl. 335—95)

The present invention has reference to a new and improved electromagnetic oscillating armature arrangement for generating periodic, mechanical oscillations which can be tapped off, especially suitable for controlling chronometers and the like.

In addition to the generally known oscillating armatures operating with pure mechanical drive, which for a long time have been particularly employed for controlling chronometers and for similar mechanisms, recently there have become known a number of constructions where the oscillating element is driven electrically or electromagnetically. In so doing, the mechanical oscillations are partially produced by transducing an oscillation existing in an electrical oscillatory circuit. Other known physical constructions possess amplifier elements and/or time-delay elements in their circuitry which amplify and/or delay an impulse received from the oscillating component for the further drive of the mechanically oscillating component of the apparatus. All of these known apparatuses require an energy storage device in the form of a battery or an accumulator in order to achieve greater accuracy and/or longer running time, or a reduction of the over-all dimensions with respect to the known mechanical energy storage devices. However, they all have in common the fact that they require a specific expenditure of structural components and circuit arrangement in order to gain the advantages offered by the use of an electric energy storage device, and which, up to the present, has prevented wide utilization of the apparent advantages.

Accordingly, it is a primary object of the present invention to provide an improved construction of electromagnetic oscillating armature arrangement which can control itself so as to be self-starting in its oscillatory motion without the interconnection of any kind of electrical amplifying and time-delay elements, wherein the oscillation frequency of the armature can be regulated by actuation through those elements which do not partake in the movement, and which can, due to the simplicity of its construction, be manufactured small enough for assembly in small apparatuses as well as economically enough to permit a wide range of application.

A further important object of this invention concerns itself with an improved construction of electromagnetic oscillating armature arrangement which is relatively simple and compact in construction, highly durable and reliable in operation, economical to manufacture, and carries out an extremely accurate controlled oscillatory movement of the armature.

In order to implement these and still further objects of the invention which will become more apparent as the description proceeds and will be readily recognized by those skilled in the art, the inventive electromagnetic oscillating armature arrangement comprises a magnetic armature which is mounted for oscillatory movement in the magnetic field of at least one stationary electromagnet and which is under the influence of a returning force. The invention further contemplates the provision of at least one stationarily arranged magnetic switch which is not actuated by the electromagnet but is connected in circuit with such electromagnet, and this magnetic switch is periodically actuated by the magnetic field of the armature which extends into the operating region or zone of response of such magnetic switch.

In the subsequent description terminology will be employed which is assumed to be within the vocabulary of, and well known to, those skilled in the art. Thus, for instance, under the term "magnetic switch" there is to be understood a generally known switch element possessing two contact elements, at least one of which is movable and resilient. These contact elements are usually hermetically arranged in a protective envelope, and by means of through-conductors piercingly extending through the envelope can be connected to an electric circuit. These switches are of the type which can be actuated by changing the intensity of the magnetic field in whose operating zone they are located. Such switches are commercially available on the market in different physical constructions.

Other features, objects and advantages of the invention will become apparent by reference to the following detailed description and drawing in which:

FIGURE 1 schematically illustrates a first embodiment of inventive oscillating armature arrangement;

FIGURE 2 is a side view schematically depicting a modified form of oscillating armature;

FIGURE 3 is a cross-sectional view of the oscillating armature of FIGURE 2, taken along the line III—III thereof;

FIGURE 4 is a view similar to FIGURE 1 schematically illustrating a further embodiment of oscillating armature arrangement employing movable pole shoes and a cylindrical armature or rotor;

FIGURE 5 is a view, also analogous to FIGURE 1, which schematically illustrates the arrangement of the essential components of an oscillating armature arrangement incorporating means enabling regulation of the magnetic field of the electromagnet; and FIGURE 6 is a schematic view, similar to FIGURE 1, of a further embodiment of inventive electromagnetic oscillating armature arrangement incorporating a regulatable electromagnet.

Describing now the drawing, and turning attention initially to the embodiment of FIGURE 1, it will be understood that there is disclosed a substantially rod-shaped, permanent magnet rotor or armature 1 which is mounted for oscillatory movement upon a shaft 2 extending perpendicular to the lengthwise axis of this rod-shaped armature 1 and to the plane of the drawing. The non-illustrated supports for the shaft 2 are preferably of the conventional, frictionless type which are generally used in precision devices for the mounting of small shafts. A spiral spring 3 which has one end 4 affixed to the armature 1 mounted upon shaft 2 and the other end 5 to a stationary portion of the non-illustrated housing, serves to return the armature 1 into the rest position depicted in FIGURE 1. In lieu of this spring 3 it would, of course, be possible to employ other return means, such as a further magnet.

In this illustrated position, the magnetic field of the armature 1 closes a magnetic switch 6 which in the activated condition of rest is normally open. This magnetic switch 6 is connected to the terminal or end 9 of a coil or solenoid 10 of an electromagnet 10/13 by means of a conductor 7 and is also connected to one pole of a direct-current supply source 11 by means of a further lead or conductor 8. It will be also recognized that the other end 12 of the solenoid 10 is electrically coupled with the other pole of this direct-current source 11. Now, when the magnetic switch 6 is closed then the current circuit is completed, a current flows through the solenoid 10 of the electromagnet 10/13, this current generating a magnetic field with N and S poles in the core 13. This magnetic field acts upon the armature 1, however not upon the magnetic switch 6. Moreover, since the armature 1 is mounted for oscillatory movement, such field also moves this armature out of its starting position in the direction of the arrow 14. However, with the movement of the armature 1, its magnetic field also moves, with the result that the magnetic switch 6 again returns into its rest state or condition, i.e., opens. Consequently, the current circuit is interrupted. As soon as the current circuit is interrupted, the magnetic field of the electromagnet 10/13 disappears at its core 13 and, thus, it no longer acts upon the armature 1. The returning force provided by the spiral spring 3 brings this armature 1 in the opposite direction back into its starting position. Hence, the magnetic switch 6 is again closed and thus the magnetic field of the electromagnet 10/13 is again built up. It is further mentioned that, additionally means can be provided for controlling the field intensity of the electromagnet 10/13; assumed here to comprise a control resistor 15, e.g., a variable resistor connected in the circuit of the solenoid 10, yet could also be a potentiometer for instance.

It will be appreciated that with the described arrangement and after a short build-up time, the armature 1 carries out a periodic oscillatory motion, the frequency of which is dependent upon the mass of the armature, the spring constant of the spiral spring 3 and upon the strength or intensity of the magnetic field of the electromagnet 10/13.

FIGURES 2 and 3 depict a variant construction of the armature or rotor 20, wherein here there is provided a permanent magnet, disc-shaped, substantially cylindrical body member 20a which is magnetized transverse to the cylinder axis, and by any suitable means 21 is fixedly connected with a shaft 22 provided at its ends 23 and 24 with journal pins or tips which can be supported in non-illustrated bearings. A small block 25 serves to secure the non-illustrated return means, e.g., spiral spring, and there is also provided a finger or projection 26 for connection to an operable member (not shown) controlled by the oscillating armature 20. It should be apparent that the thickness of the disc-like cylindrical armature 20 does not influence the function of the oscillatory armature arrangement and can be selected within those limits permissible for installation.

FIGURE 4 depicts a further embodiment of inventive electromagnetic oscillating armature arrangement which has been illustrated substantially analogous to the showing of FIGURE 1. Here, a permanent magnet, disc-shaped, substantially cylindrical rotor or armature 30 which is magnetized transverse to the axis of such disc-shaped armature is secured to a shaft 31, the lengthwise axis of which is perpendicular to the plane of the paper. This shaft 31 is mounted at its ends in any suitable non-illustrated frictionless bearings. A spiral or hair spring 32 affixed at one end 33 to the armature 30 and at its other end 34 to a stationary portion of the housing, serves to return the armature 30 into the starting position depicted in FIGURE 4. In this position the magnetic field of the armature 30 closes a magnetic switch 35, here shown disposed perpendicular to the plane of the drawing and in the inactivated rest condition is normally open. It is also to be understood that the magnetic switch 35, in addition to the position depicted in FIGURE 4, can also be arranged in the plane of the paper without adversely affecting the operation of the apparatus.

Magnetic switch 35 is coupled by means of a suitable lead or conductor 36 to the end 38 of a coil or solenoid 39 of an electromagnet 39/42 and by means of a further conductor 37 to one pole of a direct-current supply source 41. It will also be recognized that the other end or terminal 40 of the solenoid 39 is electrically coupled with the other pole of this direct-current supply source 41. Solenoid 39 is wound about the core 42 incorporating the two yokes 42a, each of which displaceably carries a pole shoe 43 and 44 each having at least one part which is movable. It will be recognized that in the illustrated embodiment the pole shoes 43 and 44 are provided with elongated slots 43a and 44a respectively, cooperating with fixing or adjustment screws 45 and 46 respectively, in order to enable these displaceable pole shoes 43 and 44 to be shifted and fixed in selected position. It will also be seen that in addition to the displaceable pole shoes 43 and 44 which enable regulation of the strength of the field of the electromagnet 39/42 there is also provided a control resistor 49 which is in circuit with the solenoid 39 and the battery 41 and permits carrying out of an even finer adjustment of the strength of this field. When the magnetic switch 35 is closed, then the current circuit is completed and a current flows through the solenoid 39 which generates a magnetic field in the core 42 and at the pole shoes 43 and 44. This magnetic field acts upon the armature 30, however not upon the magnetic switch 35.

Now, since the armature 30 is mounted for oscillatory motion such magnetic field moves this armature 30 out of its starting position in the direction of the arrow 47. Together with the motion of the armature 30, its magnetic field also moves, whereby the magnetic switch 35 is again returned into its rest condition, i.e. opens, and thus interrupts the supply of current to the solenoid 39. Thus, with the absence of current, the magnetic field in the core 42 and in the pole shoes 43 and 44 of the electromagnet 39/42 disappears and, thus, also the attraction force exerted upon the armature 30. Hence, the return force of the spiral spring 34 returns this armature 30 in the opposite direction back into its starting position. When this happens, the magnetic switch 35 is once again closed and the work cycle begins anew.

As already mentioned, the frequency of the oscillations carried out by the armature 30, among other things, is dependent upon the field intensity of the electromagnet 39/42. This field intensity in turn, with given electrical dimensioning, is inversely proportional to the magnetic resistance of the magnetic circuit of the electromagnet. An essential factor of this magnetic resistance is the size of the air-gap 48 between the armature 30 and the pole shoes 43 and 44. By selectively displacing these pole shoes 43 and 44 it is possible to change the size of the air-gap 48, thereby the oscillatory frequency of the armature 30. An even further possibility for finer regulation of the field, and as previously developed, is given by means of the variable resistor 49, which could also be a potentiometer.

FIGURE 5 schematically illustrates a further embodiment of electromagnetic oscillating armature arrangement wherein, for convenience in illustration, the electric conductors as well as the spiral spring exerting the return force upon the armature, have not been shown. Also omitted is the control resistor which can be used as a fine adjustment for regulating the strength of the magnetic field. Analogous to the showing of FIGURE 1, reference character 50 also designates a rod-shaped, permanent magnet armature which is mounted for oscillating movement upon a shaft 51 disposed substantially perpendicular to the axis of this rod-shaped armature. In its illustrated starting position this armature 50 closes the magnetic switch 52 which is normally open. Closing of the magnetic switch 52 completes the current circuit between the non-illustrated current supply source and the coil 53 of the electromagnet 53/54 possessing stationary pole shoes 55 and 56. Once again, the thus resulting magnetic field of the electromagnet 53/54 rotates the armature 50, in the direction of the arrow 51, out of its starting position, the magnetic switch 52 again opening, and the current supply for the electromagnet 53/54 is interrupted. In addition to, or in lieu of the control resistor, it is also possible to change the oscillation frequency of the armature 50 by suitable means, shortly to be considered, which influence the field intensity of the electromagnet 53/54; however in this case the pole shoes 55, 56 are not movable for this purpose as with the previous embodiment. Here, such regulation possibility is provided by means of a displaceable metallic member, here shown in the form of a rod or bar 58 provided with an elongated slot 58a and selectively secured in desired position by means of an adjustment or fastening screw 59 to the non-illustrated housing. This bar or rod 58 can be formed of a magnetizable material or of a permanent magnetic material. By means of this metallic member 58, a portion of the magnetic lines or flux of the electromagnet 53/54 are deviated or deflected, so that they do not act upon the armature 50. Regulation of the field intensity of the electromagnet 53/54 and thus the oscillation frequency of the armature 50 is achieved by merely selectively displacing this metallic rod member 58.

FIGURE 6 depicts still a further variant of the inventive oscillatory armature arrangement in schematic representation. The depicted rod-shaped, permanent magnet armature 60 is mounted for oscillatory movement upon a shaft 61 which is disposed perpendicular to the axis of this rod-shaped armature 60. Here, also a spiral spring 62 returns the armature 60 into its depicted starting position. In this position, the magnetic field of the armature 60 closes the magnetic switch 63 which is normally open in its state of rest. Magnetic switch 63, when closed, completes the current circuit from the battery 64 via the coil 65 of the electromagnet 65/66 and via the coil 67 of a second electromagnet 67/68 back to the battery 64. As a result, and analogous to the embodiments depicted in FIGURES 1, 4 and 5, the armature 60 is rotated out of its starting position in the direction of the arrow 69 until the magnetic switch 63 again interrupts the aforementioned current circuit and the spiral spring 62 again returns the armature 60 back into its starting position.

For controlling or regulating the intensity of the field of the electromagnet 65/66 and thus the oscillation frequency of the armature 60, there is here provided the second electromagnet 67/68 which has its core 68 displaceably mounted at the non-illustrated housing by any suitable means, so that it can move in the direction of the double-headed arrow 70. Since the sense or direction of winding of the coil 67 of the second electromagnet 67/68 is opposite that of the coil 65 of the electromagnet 65/66 the second electromagnet 67/68 always brings about a more or less pronounced reduction of the field strength of the first electromagnet 65/66, and this depends upon the assumed position of the displaceable core 68 with respect to the first electromagnet 65/66. Apart from this regulation possibility there can also here be provided a control resistor 71 in the current circuit so that the strength of the field of the electromagnet 65/66 can be even finer adjusted, and such adjustment would be possible irrespective of whether the core 68 is movable. With a given adjusted field strength for a certain oscillatory frequency of the armature 60 and with constant potential of the battery 64, the oscillatory frequency remains constant. However, it is known that the voltage of batteries drops with increasing discharge, whereby also the current intensity drops in the described current circuit. With reduced current intensity the field strength of the electromagnet 65/66 also drops, this resulting in an undesired change in the oscillatory frequency. Since, however, the second electromagnet 67/68 is connected in series with the first electromagnet 65/66 and generates a field which opposes the field of the last-mentioned electromagnet, with a reduction in the current intensity the counteracting action of the field of the second electromagnet 67/68 will also reduce, whereby as the resultant magnetic field of both electromagnets 65/66 and 67/68 an almost constant magnetic field continually acts upon the armature 60, independent of the voltage of the battery 64. In this way, there is also achieved a good stability of the oscillatory frequency of the rotor 60. Finally, it is mentioned that the electromagnet 67/68 could also be connected in parallel with the current supply source 64.

It is also to be understood that still further arrangements could be undertaken without deviating from the inventive concepts and the underlying principles of this invention. Thus, for instance, it would be conceivable to use a rotor or armature having a plurality of poles for controlling a magnetic switch which closes the current circuit for a number of electromagnets. Furthermore, as already indicated, the returning force acting upon the armature can be generated by elements other than a spiral spring, for example a magnet. Further, the rotor or armature could be constructed in the form of a pendulum, and therefore it is to be clearly understood that the term "rotor" or "armature" as employed herein is used in its broader sense and is not to be interpreted as limited to a member which is mounted for rotational movement along a circular path; rather can also encompass, among other things, a member which is mounted for movement in the manner of a pendulum. In such case, gravity could serve as the return force for such type armature. All of the aforedescribed as well as the briefly mentioned constructions, however, have in common the feature of at least one magnetic switch which can be directly actuated by the field of the armature and without the aid of amplifying elements controls a current circuit which results in the armature being deflected out of its starting position.

While there is shown and described present preferred embodiments of the invention, it is to be distinctly understood that the invention is not limited thereto but may be otherwise variously embodied and practised within the scope of the following claims.

What is claimed is:

1. Electromagnetic oscillating armature arrangement for the generation of periodic, mechanical oscillations which can be tapped off for controlling chronometers, comprising at least one stationary electromagnet, a permanent magnet armature located externally of said stationary electromagnet and under the effect of a restoring force tending to maintain the armature in a rest position, means mounting said armature for oscillatory motion in the magnetic field of and externally of said at least one stationary electromagnet, the field of said electromagnet producing a force on said armature in said rest position to move said armature therefrom, a current circuit provided for said at least one stationary electromagnet, at least one magnetic switch electrically coupled in said current circuit periodically actuated by the magnetic field of said armature extending into the response zone of said magnetic switch, said magnetic switch being situated such that it is not actuated by the magnetic field of said at least one stationary electromagnet.

2. Electromagnetic oscillating armature arrangement as defined in claim 1, wherein said magnetic armature is a substantially rod-shaped member magnetized along its lengthwise axis, a shaft member upon which said magnetic armature is mounted for oscillatory motion, said shaft member extending substantially perpendicular to the lengthwise axis of said rod-shaped member.

3. Electromagnetic oscillating armature arrangement as defined in claim 1, wherein said magnetic armature comprises a substantially cylindrical body member which is magnetized transverse to its cylinder axis, means mounting said magnetic armature for oscillatory motion about said cylinder axis.

4. Electromagnetic oscillating armature arrangement as defined in claim 1, further including means for exerting the returning force upon said magnetic armature.

5. Electromagnetic oscillating armature arrangement as defined in claim 4, wherein said returning means incorporates a resilient element acting upon said magnetic armature.

6. Electromagnetic oscillating armature arrangement as defined in claim 1, wherein said magnetic switch is constructed such that in its state of rest it is normally open.

7. Electromagnetic oscillating armature arrangement as defined in claim 6, further including means for controlling the magnetic field of said at least one stationary electromagnet.

8. Electromagnetic oscillating armature arrangement as defined in claim 7, wherein said at least one stationary electromagnet incorporates movable pole shoes, said movable pole shoes providing said means for controlling said magnetic field.

9. Electromagnetic oscillating armature arrangement as defined in claim 7, wherein said electromagnet incorporates pole shoes each having at least one part which is movable, said movable part of said pole shoes providing said means for controlling said magnetic field.

10. Electromagnetic oscillating armature arrangement as defined in claim 7, wherein said means for controlling the magnetic field of said at least one stationary electromagnet comprises a movably mounted, magnetizable metallic member.

11. Electromagnetic oscillating armature arrangement as defined in claim 7, wherein said means for controlling the magnetic field of said at least one stationary electromagnet comprises a movable magnet.

12. Electromagnetic oscillating armature arrangement as defined in claim 7, wherein said means for controlling the magnetic field of said at least one stationary electromagnet comprises a control resistor.

13. Electromagnetic oscillating armature arrangement as defined in claim 7, wherein said means for controlling the magnetic field of said at least one stationary electromagnet comprises a further electromagnet.

14. Electromagnetic oscillating armature arrangement as defined in claim 13, wherein said further electromagnet is displaceable.

15. Electromagnetic oscillating armature arrangement as defined in claim 14, wherein said further displaceable electromagnet incorporates a movable core.

16. Electromagnetic oscillating armature arrangement as defined in claim 13, wherein said current circuit includes a current supply source, said further electromagnet being electrically coupled with said current supply source.

17. Electromagnetic oscillating armature arrangement as defined in claim 16, wherein said further electromagnet is also in circuit with said magnetic switch.

18. Electromagnetic oscillating armature arrangement as defined in claim 13, wherein said means for controlling the magnetic field of said at least one stationary electromagnet further includes a control resistor electrically coupled with said further electromagnet.

19. Electromagnetic oscillating armature arrangement as defined in claim 13, wherein the sense of winding of said further electromagnet is opposite said at least one stationary electromagnet, said current circuit including a current supply source, both of said aforementioned electromagnets being connected in series through the agency of said magnetic switch with said current supply source.

20. Electromagnetic oscillating armature arrangement as defined in claim 1, wherein said at least one stationary electromagnet has the same number of poles as the number of poles of said magnetic armature.

References Cited by the Examiner

UNITED STATES PATENTS

| | | | |
|---|---|---|---|
| 1,970,412 | 9/1934 | Bates | 200—87 |
| 2,109,953 | 3/1938 | Bates | 200—87 |
| 2,245,596 | 6/1941 | Lindberg | 200—87 |

BERNARD A. GILHEANY, *Primary Examiner.*

J. J. BAKER, *Assistant Examiner.*